(12) United States Patent
Zukawa et al.

(10) Patent No.: US 6,414,609 B1
(45) Date of Patent: Jul. 2, 2002

(54) DATA WIDTH CONVERSION APPARATUS AND DATA PROCESSING APPARATUS

(75) Inventors: Makoto Zukawa; Toshihide Tsuzuki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/948,770

(22) Filed: Sep. 10, 2001

(30) Foreign Application Priority Data

Apr. 16, 2001 (JP) ........................................ 2001-116535

(51) Int. Cl.[7] ................................................ H03M 7/40
(52) U.S. Cl. .............................. 341/67; 341/65; 710/66
(58) Field of Search ............................ 341/63, 65, 67; 708/552; 710/66

(56) References Cited

U.S. PATENT DOCUMENTS 5,173,695 A * 12/1992 Sun et al. ...................... 341/67
5,666,116 A * 9/1997 Bakhmutsky ................. 341/67
5,802,399 A    9/1998 Yumoto et al.
6,172,626 B1 * 1/2001 McDonnell et al. .......... 341/67

FOREIGN PATENT DOCUMENTS

| JP | SHO 63-296158 | 12/1988 |
| JP | SHO 64-31252  | 2/1989  |
| JP | HEI 04-119446 | 4/1992  |
| JP | HEI 09-91197  | 4/1997  |

* cited by examiner

*Primary Examiner*—Patrick Wamsley
(74) *Attorney, Agent, or Firm*—Staas & Halsey LLP

(57) ABSTRACT

A data width conversion apparatus has a buffer for storing output-incomplete partial data of input data received in the past and a block shifter for combining the output-incomplete partial data stored in said buffer with new input data. In the combined data by the block shifter, a portion of a fixed data width is outputted in form of an output data, and data less than the fixed data width or data exceeding the fixed data width is stored in the buffer so as to be combined with the successive input data.

5 Claims, 10 Drawing Sheets

DATA WIDTH CONVERSION APPARATUS AND DATA PROCESSING APPARATUS

BACKGROUND OF THE INVENTION

1. Field of the Invention

The present invention relates to a data width conversion apparatus for converting data having various data widths sequentially generated into data each having a predetermined fixed data width and sequentially outputting the same, and a data processing apparatus, having a structure corresponding to such a data width conversion apparatus, for executing a receiving processing for input data and sequentially outputting a result of the processing in form of output data of the fixed data width.

2. Description of the Related Art

Recently, there are widely performed various types of data communications, for example, a packet communication on a network such as Internet, and a communication for image data obtained through a digital video. Those data communications need a complicated data processing. In the data communications, a series of data is divided in accordance with contents of processing to perform a necessary data processing on a data unit, and after the processing, the divided data are combined to a series of data. To achieve this, there is a need of processing that data having various data widths after the data processing are converted into data each having a predetermined fixed data width.

To convert data having various data widths into data having fixed data width, generally, there is adopted such a system that a shift register is used and whenever a predetermined data length of data is stored in the shift register, an output is performed.

However, according to such a system, it is impossible to process various widths of data in unit of data, and it is obliged to process the data in unit of fixed length such as unit of bit or unit of byte. Thus, it takes a long processing time, since the processing in unit of fixed length is performed for various widths of data. This involves such a problem that a communication speed is lowered.

With respect to a technology of conversion of data width, it is proposed for example in Japanese Patent Laid Open Gazette Sho.63-296158, Japanese Patent Laid Open Gazette Sho.64-31252, Japanese Patent Laid Open Gazette Hei.4-119446 and Japanese Patent Laid Open Gazette Hei.9-91197. However, the technology disclosed in those gazettes relate to a data communication between apparatuses dealing with data having mutually different data widths, such as a data communication between a central processing unit (CPU) and a peripheral unit, which deal with data having mutually different data widths, for example, between a CPU of 32 bits width and a memory of 16 bits width or 8 bits width. The technology disclosed in those gazettes relate to a data communication between apparatuses, which deal with data having a fixed bit width, while a data transmitting side and a data receiving side are concerned with mutually different bit widths. Such a technology is not applicable to a technology of converting various data widths of data into fixed data width of data.

SUMMARY OF THE INVENTION

In view of the foregoing, it is an object of the present invention to provide a data width conversion apparatus for efficiently converting data having various data widths sequentially generated into data each having a fixed data width and sequentially outputting the same, and a data processing apparatus for executing a receiving processing for input data and efficiently converting a result of the processing into output data of the fixed data width and outputting the same.

To achieve the above-mentioned object, the present invention provides a data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

a buffer for storing output-incomplete partial data of the input data received in the past; and a block shifter for combining the output-incomplete partial data stored in said buffer with new input data, wherein when data width of combined data of the output-incomplete partial data stored in said buffer with new input data is less than the fixed data width, the combined data is stored in said buffer in form of the output-incomplete partial data, when the data width of the combined data is identical to the fixed data width, the combined data is outputted to an exterior in form of the output data, and when the data width of the combined data exceeds the fixed data width, of the combined data partial data consisting of a portion of same data width as the fixed data width is outputted to an exterior in form of the output data, and of the combined data partial data consisting of a portion excepting the portion of the same data width as the fixed data width is stored in said buffer in form of the output-incomplete partial data.

The data width conversion apparatus of the present invention has the buffer and the block shifter. The buffer stores therein a remaining partial data. The block shifter combines the partial data stored in the buffer with the newly entered input data to form a predetermined fixed data width of data. The predetermined fixed data width of data is outputted to the exterior whenever it is formed. A further remaining data is stored in the buffer. This sequence is repeated. This feature makes it possible to effectively convert input data having various data width into output data having the fixed data width.

While the present invention is comprehensively expressed as mentioned above, specifically, the present invention may be expressed as follows.

To achieve the above-mentioned object, the present invention provides a first data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

first and second block shifters for receiving two types of data one of which is the input data to combine the two types of data and thereby outputting data having data width of a sum of data widths of the two types of data wherein the fixed data width is a maximum data width;

a selector for receiving total two types of data outputted from said first and second block shifters to output either one of the two types of data;

a slide buffer for storing therein the data outputted from said selector and outputting the stored data to an exterior in form of the output data when a data width of the stored data is identical to the fixed data width;

a barrel shifter for shifting the input data by an arbitrary number to extract and output a part of the input data; and a temporary buffer for storing the data outputted from said barrel shifter, wherein said first block shifter receives the input data and the data stored in said slide buffer, said second block shifter receives the input data and the data stored in said temporary buffer, said selector transmits the data outputted from said first block shifter to said slide buffer when said temporary buffer stores no effective data, and transmits the data outputted from said second block shifter to said slide buffer when said temporary buffer stores effective data, and said barrel shifter extracts from new input data a portion exceeding the fixed data width of a combined data wherein the new input data is combined with the data stored in said temporary buffer when said temporary buffer stores effective data, or the data stored in said slide buffer when said temporary buffer stores no effective data, when a data width of the combined data exceeds the fixed data width, the extracted portion being transferred to said temporary buffer.

A combination of the first block shifter and the second block shifter in the first data width conversion apparatus corresponds to the block shifter in the data width conversion apparatus of the present invention which is comprehensively expressed. And a combination of the temporary buffer and the slide buffer in the first data width conversion apparatus corresponds to the buffer in the data width conversion apparatus of the present invention which is comprehensively expressed.

To achieve the above-mentioned object, the present invention provides a second data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

first and second block shifters for receiving two types of data one of which is the input data to combine the two types of data and thereby outputting data having data width of a sum of data widths of the two types of data wherein the fixed data width is a maximum data width;

a slide buffer for storing therein the data outputted from said first block shifter and outputting the stored data to an exterior in form of the output data; and a temporary buffer for storing the data outputted from said second block shifter, wherein both of said first and second block shifters receive the input data and the data stored in said temporary buffer, said first block shifter generates and transmits to said slide buffer a combined data wherein a new input data is combined with the data stored in said temporary buffer when a data width of the combined data is identical to the fixed data width, and generates and transmits to said slide buffer, of the combined data, partial data consisting of a portion of same data width as the fixed data width when the data width of the combined data exceeds the fixed data width, and said second block shifter generates a combined data wherein a new input data is combined with the data stored in said temporary buffer when a data width of the combined data is less than the fixed data width, so that the combined data is stored in said temporary buffer, and generates and transmits to said temporary buffer partial data consisting of a portion excepting said partial data generated by said first block shifter when the data width of the combined data exceeds the fixed data width.

In the second data width conversion apparatus, in a similar fashion to the first data width conversion apparatus, a combination of the first block shifter and the second block shifter and a combination of the temporary buffer and the slide buffer correspond to the block shifter and the buffer in the data width conversion apparatus of the present invention which is comprehensively expressed, respectively.

To achieve the above-mentioned object, the present invention provides a third data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

a block shifter for receiving two types of data one of which is the input data to combine the two types of data and thereby outputting data having data width of a sum of data widths of the two types of data wherein the fixed data width is a maximum data width;

a slide buffer for storing therein the data outputted from said block shifter and outputting the stored data to an exterior in form of the output data when a data width of the stored data is identical to the fixed data width;

a barrel shifter for shifting the input data by an arbitrary number to extract and output a part of the input data;

a temporary buffer for storing the data outputted from said barrel shifter, and a selector for receiving the data stored in said temporary buffer and the data stored in said slide buffer to selectively output either one of two types of data, wherein said selector transmits the data stored in said slide buffer to said block shifter when said temporary buffer stores no effective data, and transmits the data stored in said temporary buffer to said block shifter when said temporary buffer stores effective data, and said barrel shifter extracts from new input data a portion exceeding the fixed data width of a combined data wherein the new input data is combined with the data stored in said temporary buffer when said temporary buffer stores effective data, or the data stored in said slide buffer when said temporary buffer stores no effective data, when a data width of the combined data exceeds the fixed data width, the extracted portion being transferred to said temporary buffer.

Here, the block shifter in the block shifter in the third data width conversion apparatus corresponds to the block shifter in the data width conversion apparatus of the present invention which is comprehensively expressed. And a combination of the slide buffer and the temporary buffer in the third data width conversion apparatus corresponds to the buffer in the data width conversion apparatus of the present invention which is comprehensively expressed.

To achieve the above-mentioned object, the present invention provides a data processing apparatus comprising:

a plurality of data processing sections for performing mutually different data processing to generate processed data, said plurality of data processing sections being permitted in a matter that generation of the processed data of mutually different data widths is permitted; and a data width conversion section for sequentially receiving a plurality of processed data generated in said plurality of data processing sections, converting the plurality of processed data sequentially received into a predetermined fixed data width of output data and sequentially outputting the output data, said data width conversion section comprising:

a buffer for storing output-incomplete partial data of the processed data received in the past; and a block shifter for combining the output-incomplete partial data stored in said buffer with new processed data, wherein when data width of combined data of the output-incomplete partial data stored in said buffer with new processed data is less than the fixed data width, the combined data is stored in said buffer in form of the output-incomplete partial data, when the data width of the combined data is identical to the fixed data width, the combined data is outputted to an exterior in form of the output data, and when the data width of the combined data exceeds the fixed data width, of the combined data partial data consisting of a portion of same data width as the fixed data width is outputted to an exterior in form of the output data, and of the combined data partial data consisting of a portion excepting the portion of the same data width as the fixed data width is stored in said buffer in form of the output-incomplete partial data.

Incidentally, in the data processing apparatus of the present invention as mentioned above, processing to be executed in the above-mentioned plurality of data processing sections is not restricted to specific processing, and any one is acceptable. A data width conversion apparatus constituting a data processing apparatus of the present invention includes all the aspects of the data width conversion apparatus of the present invention.

DETAILED DESCRIPTION OF PREFERRED EMBODIMENTS

Embodiments of the present invention will be described with reference to the accompanying drawings.

Figure 1:
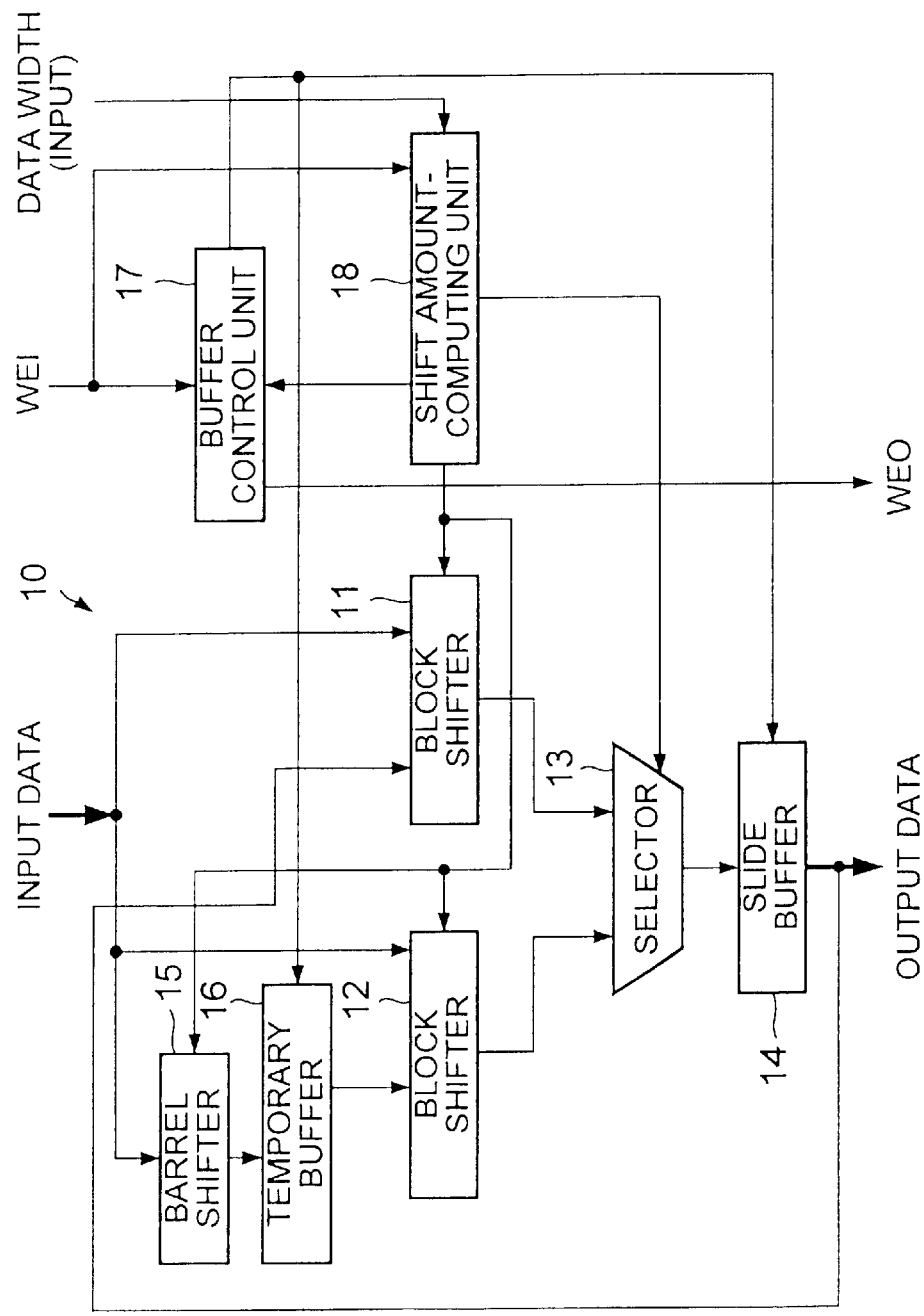
FIG. 1 is a block diagram showing a first embodiment of a data width conversion apparatus of the present invention.

FIG. 1 is a block diagram showing a first embodiment of a data width conversion apparatus of the present invention.

A data width conversion apparatus 10 shown in FIG. 1 comprises a first block shifter 11 and a second block shifter 12.

Figure 2:
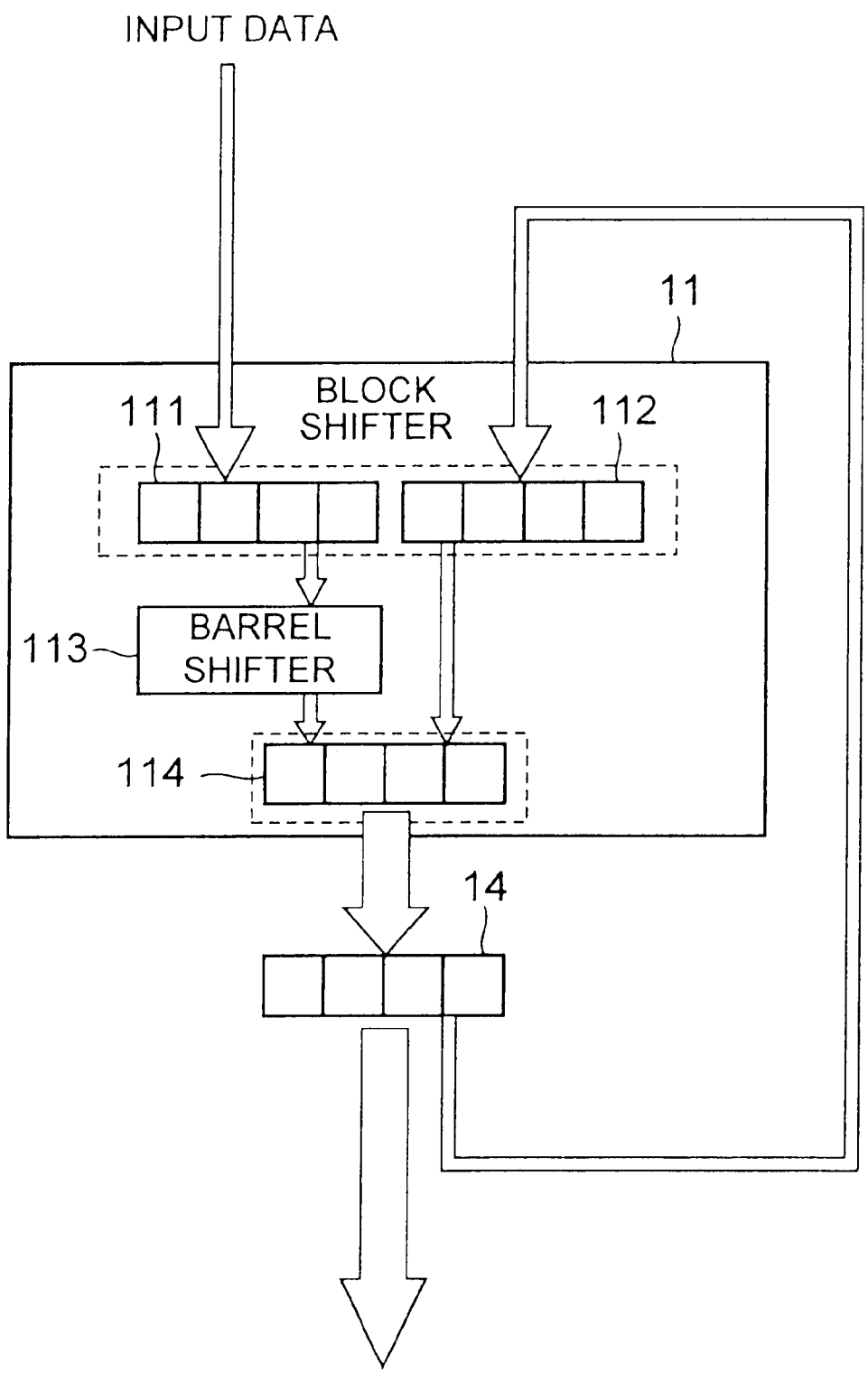
FIG. 2 is an explanation view of an operation of a block shifter.

FIG. 2 is an explanation view of an operation of a block shifter. Here, there will be explained the first block shifter 11. The second block shifter 12 has the same structure as the first block shifter 11.

The block shifter 11 has two input buffers 111 and 112 for temporarily storing two pieces of data. The two input buffers 111 and 112 receive input data entered from an exterior and data store in the slide buffer 14 shown also in FIG. 1. A barrel shifter 113 shifts data stored in the input buffer 111 by an arbitrary number and stores the same in an output buffer 114. Here, the barrel shifter 113 shifts the data by the number corresponding to the same width as the data width of the data stored in the input buffer 112 so as to avoid overlapping with the data entered from the slide buffer 14 to the input buffer 112. The data stored in the input buffer 112 is stored in the output buffer 114 in timing that the data stored in the input buffer 111 is shifted by the barrel shifter 113 and is stored in the output buffer 114. In this manner, the output buffer 114 stores data having data width of the sum of data widths of two data stored in the two input buffers 111 and 112, in which those two data are aligned (here it is referred to as two data being combined). However, the data stored in the output buffer 114 is one having a data width above than a predetermined fixed data width determined by a bit width of the output buffer 114. When the sum of data widths of two data stored in the two input buffers 111 and 112 exceeds the predetermined fixed data width, data will disappear from the block shifter 11 by the corresponding amount that the sum of data widths of two data exceeds the predetermined fixed data width, of the input data stored in the input buffer 111. In the data width conversion apparatus 10 shown in FIG. 1, however, partial data, which will be disappear from the block shifter 11, is extracted by a barrel shifter 15 and is stored in a temporary buffer 16.

The data stored in the output buffer 114 of FIG. 2 is transferred to the slide buffer 14. When the data transferred to the slide buffer 14 is of the predetermined fixed data width, the data is outputted in form of out put data to the exterior. On the other hand, when the data transferred to the slide buffer 14 is less than the predetermined fixed data width, the data is again fed to the input buffer 112 so the above processing is repeated between it and the input data next fed from the exterior.

For convenience of the explanation, it is explained that the block shifter 11 shown in FIG. 2 has the two input buffers 111 and 112, and the output buffer 114. However, in the event that before the block shifter 11 there is a buffer for temporarily storing the input data, it is acceptable that such a buffer is used instead of the input buffer 111, and it is also acceptable that the input buffer 112 and the output buffer 114 are replaced by the slide buffer 14.

For the purpose of simplification of the explanation, it is explained that data width (fixed data width) of the output data is determined by the bit width of the slide buffer 14.

However, as far as it is concerned with a limit within the bit width of the slide buffer 14, it is acceptable to provide such an arrangement that a control signal for designating a data width is fed from the exterior and an output data of an arbitrary fixed bit width is stored in the slide buffer 14 and then outputted to the exterior. In this case, the data width conversion apparatus 10 shown in FIG. 1 operates in its entirety so as to generate output data of a data width according to the control signal entered from the exterior. This is the same also with respect to other embodiments that will be explained in conjunction with FIG. 3 and the following figures.

In the above, it is explained that the barrel shifter 113 is used to shift the input data by the corresponding amount that the input data exceeds the fixed bit width. In this case, there is a need always to enter the input data in such a form that the input data is aligned so as to be pulled to the side. Alternatively, it is acceptable that the block shifter 11 receives a signal indicating an effective bit area together with the input signal to designate and process an effective portion of data. In the event that the block shifter 11 is arranged in the manner as mentioned above, the data width conversion apparatus 10 shown in FIG. 1, which includes the second block shifter 12 and the barrel shifter 15, is arranged in its entirety to perform the associated processing. This is the same also with respect to other embodiments that will be explained in conjunction with FIG. 3 and the following figures.

Further, in the above, while the explanation of the block shifter 11 shown in FIG. 2 is made taking it into consideration that data is unequivocally pulled to one of the edges, it is acceptable to provide an arrangement in accordance with which it is possible to cope with either of right close and left close in accordance with a control signal from the exterior.

Also in this case, not only the block shifter 11 but also the data width conversion apparatus 10 shown in FIG. 1, which includes the second block shifter 12 and the barrel shifter 15, is arranged in its entirety so as to be able to cope with either of right close and left close. This is the same also with respect to other embodiments that will be explained in conjunction with FIG. 3 and the following figures.

Now returning to FIG. 1 there will be continued the explanation.

The data width conversion apparatus 10 shown in FIG. 1, which comprises the first block shifter 11 and the second block shifter 12, further comprises a selector 13 and the slide buffer 14 which is also shown in FIG. 2. In FIG. 2, for the purpose of simplification of the explanation, the selector 13 is omitted.

The selector 13 receives total two data, which are outputted from the first block shifter 11 and the second block shifter 12, respectively, and outputs either one of the two data.

The slide buffer 14 stores the data outputted from the selector 13. When the data width of the stored data is the fixed data width, the stored data is outputted in form of the output data to the exterior.

Here, fed to the data width conversion apparatus 10 shown in FIG. 1 are an input write enable signal WEI representative of timing for reading the input data and a signal representative of a data width of the input data entered at that time as well as the input data. The input write enable signal WEI is fed to a buffer control unit 17 and a shift amount-computing unit 18. The signal representative of the data width of the input data is fed to the shift amount-computing unit 18. The shift amount-computing unit 18 computes the respective shifting amount of the first block shifter 11 and the second block shifter 12, and the barrel shifter 15 in accordance with information as to the data width of the input data sequentially inputted, and outputs a control signal indicating the respective shifting amount to the first block shifter 11 and the second block shifter 12, and the barrel shifter 15. Further, the shift amount-computing unit 18 can identify whether effective data is now stored in the temporary buffer, in accordance with information as to data width of the input data sequentially supplied. Thus, the shift amount-computing unit 18 controls the selector 13 in such a manner that when the effective data is not stored in the temporary buffer 16, data outputted from the first block shifter 11 is transmitted to the slide buffer 14, and when the effective data is stored in the temporary buffer 16, data outputted from the second block shifter 12 is transmitted to the slide buffer 14.

The buffer control unit 17 controls a timing for taking data into the slide buffer 14 and the temporary buffer 16 in accordance with the input write enable signal WEI, and outputs an output write enable signal WEO when the slide buffer 14 stores data of a predetermined fixed data width in accordance with information from the shift amount-computing unit 18. A data receiving circuit (not illustrated), which is connected to the latter stage of the data width conversion apparatus 10, reads data stored in the slide buffer 14 upon receipt of the output write enable signal WEO. This makes it possible that the data receiving circuit sequentially receives data of a fixed data width.

The input data is fed to not only the first block shifter 11 and the second block shifter 12, but also the barrel shifter 15. As described above referring to FIG. 2, it happens that the sum of the data width of two data (data from the slide buffer 14 and a new input data) fed to the first block shifter 11 exceeds a fixed data width which is a unit of output at one time. At that time, the barrel shifter 15 shifts the input data by an amount of shift in which a partial data exceeding the output data of the fixed data width, in accordance with an instruction from the shift amount-computing unit 18, and sends the same to the temporary buffer 16. The temporary buffer 16 stores therein the exceeding partial data (the output-incomplete partial data referred to in the present invention). In this manner, when the temporary buffer 16 stores therein the effective data, the selector 13 is changed over so that the output data of the second block shifter 12 is transmitted to the slide buffer 14. Thus, when the subsequent input data is fed, the second block shifter.12 is operative, so that the output-incomplete partial data stored in the temporary buffer 16, which goes over the previous output data, is combined with the input data now entered, as explained referring to FIG. 2, and the combined data is stored in the slide buffer 14. When the data width of the combined data of the output-incomplete partial data stored in the temporary buffer 16 with the input data now entered is just coincident to the data width (the fixed data width) of the output data, the data combined in the second block shifter 12 is stored in the slide buffer 14, and the output write enable signal WEO is outputted from the buffer control unit 17. On the other hand, in the event that the data width of the combined data of the output-incomplete partial data stored in the temporary buffer 16 with the input data now entered is less than the data width (the fixed data width) of the output data, the data combined in the second block shifter 12 is stored in the slide buffer 14, but the output write enable signal WEO is not outputted. Since there is now a state that the temporary buffer 16 does not store therein the effective data, the selector 13 is changed over so that the output of the first block shifter 11 is transmitted to the slide buffer 14. Thus now the first block shifter 11 is effective, and creates data of a combination of the data less than the fixed data width stored in the slide buffer 14 and input data subsequently newly entered, as explained referring to FIG. 2. At that time, when there exists partial data that goes over the fixed data width, as mentioned above, the partial data is extracted by the barrel shifter 15 and then stored in the temporary buffer 16. When the subsequent input data is entered, the second block shifter 12 is effective.

Also in the event that there exists on the second block shifter 12 partial data that goes over the fixed data width when the output-incomplete partial data stored in the temporary buffer 16 is combined with the input data newly entered, the partial data is extracted by the barrel shifter 15 and then stored in the temporary buffer 16.

Regardless of the fact that the first block shifter 11 is effective or the second block shifter 12 is effective in accordance with changing over by the selector 13, in the event that there exists partial data going over the fixed data length when two data are combined by now effective block shifter, the effective block shifter creates data having data width (fixed data length) of the output data. Such data is stored in the slide buffer 14 and the output write enable signal WEO is outputted from the buffer control unit 17. The partial data going over is stored in the temporary buffer 16 as mentioned above.

In the manner as mentioned above, in the event that the data width conversion apparatus 10 shown in FIG. 1 sequentially receives input data having various data widths, the data width conversion apparatus 10 converts the input data into output data having the fixed data width and then sequentially outputs the same. Further, according to the data width conversion apparatus 10 shown in FIG. 1, in order to convert the input data having various data widths sequentially inputted into the output data having the fixed data width, there is adopted a circuit structure in which the barrel shifter 15 and the barrel shifter (cf. FIG. 2) constituting the block shifters 11 and 12 are used to shift data by an amount of shift corresponding to the data width of the output-incomplete partial data and the data width of the newly entered input data. Thus, as compared with the conventional apparatus capable of dealing with only data of the fixed width in unit of bit or unit of byte, it is possible to greatly improve a data width conversion processing speed.

While the above explanation has been made on the assumption that various data widths of input data are sequentially applied, the data width conversion apparatus 10 shown in FIG. 1 is not to deny one in which always same data widths of input data are sequentially applied. In such a case, the data width conversion apparatus 10 will operate as a data width conversion apparatus for converting a fixed data width of input data into a different fixed data width of output data. This is applicable to alternative embodiments that will be described hereinafter.

Figure 3:
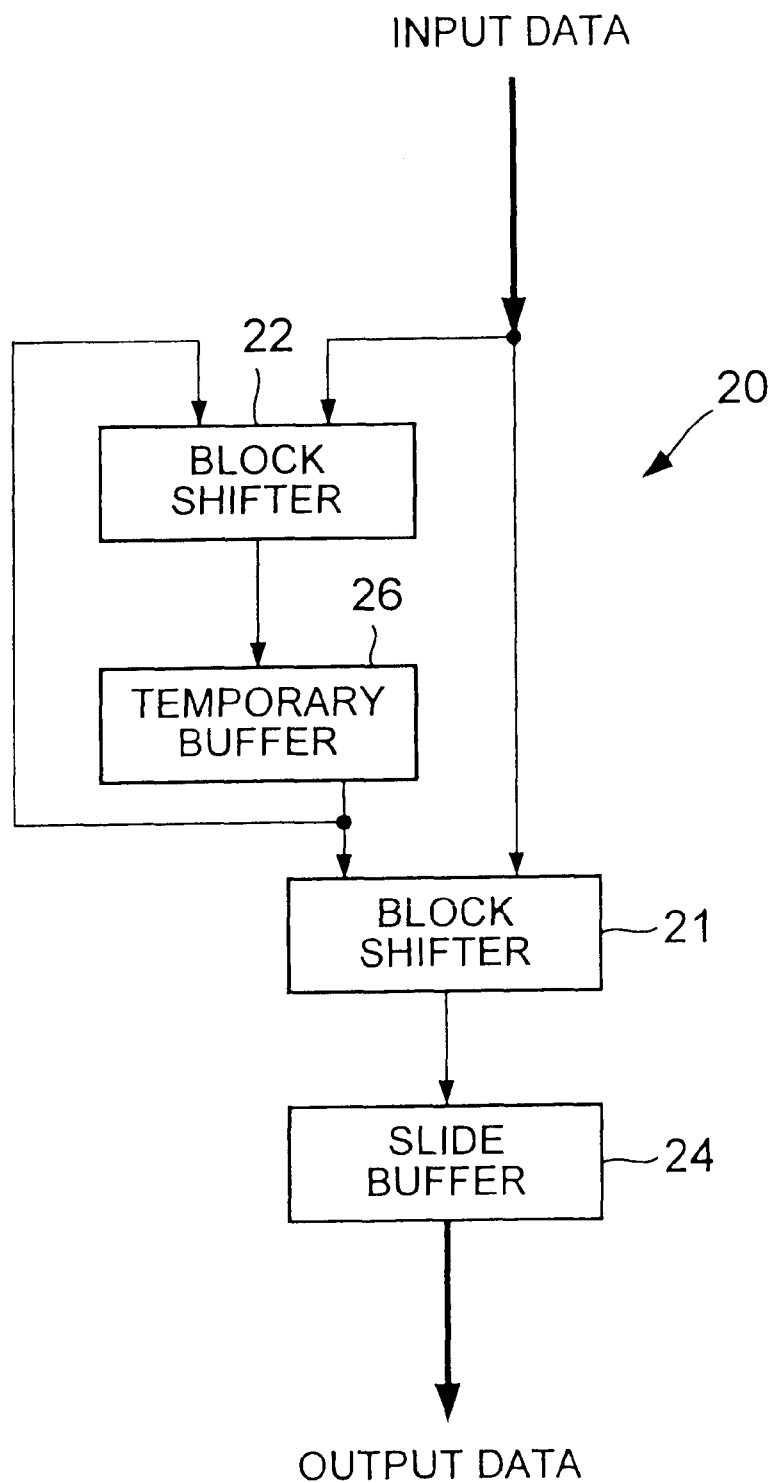
FIG. 3 is a block diagram showing a second embodiment of a data width conversion apparatus of the present invention.

FIG. 3 is a block diagram showing a second embodiment of a data width conversion apparatus of the present invention. Here, in order to avoid complication in illustration, there are omitted structural portions corresponding to the buffer control unit 17 and the shift amount-computing unit 18.

A data width conversion apparatus 20 shown in FIG. 3 comprises a first block shifter 21, a second block shifter 22, a slide buffer 24 and a temporary buffer 26.

When input data is fed to the first block shifter 21, the first block shifter 21 generates data in combination of the data stored in the temporary buffer 26 and the new input data. The data thus generated is stored in the slide buffer 24. At that time, when the data width of the data combined in the first block shifter 21 is equal to the data width (the fixed data width) of the output data, the combined data is stored in the slide buffer 24 and the output write enable signal WEO is outputted from the buffer control unit (cf. the buffer control unit 17 in FIG. 1). On the other hand, when the data obtained through the combination in the first block shifter 21 is of the data width which is less than the data width of the output data, the data in combination is not dealt with as the output data and be ignored, even if it is stored in the slide buffer 24. When the data width in combination of the data width of the data stored in the temporary buffer 26 and the data width of the new input data exceeds the data width (the fixed data width) of the output data, the first block shifter 21 generates data of the fixed data width. The data thus generated is stored in the slide buffer 24. While the data stored in the slide buffer 24 is dealt with as the output data, there will bring about a partial data going over in combination of data in the first block shifter 21.

The shift amount-computing unit (cf. the shift amount-computing unit 18 FIG. 1), not illustrated in FIG. 3, orders the second block shifter 22 to perform a shift by an amount of shift according to an amount of going over in data, since the amount of going over in data is known. The second block shifter 22 extracts data of a portion going over to be stored in the temporary buffer 26.

In the event that the temporary buffer 26 stores data and the new input data is fed, when data width in combination of the data width of the data stored in the temporary buffer 26 with the data width of the new input data is less than the data width of the output data, the second block shifter 22 combines the data stored in the temporary buffer 26 with the new input data, so that a combined data is stored again in the temporary buffer 26.

In the data width conversion apparatus 20 shown in FIG. 3, whenever the input data is fed, the above-mentioned operation is repeated, so that the output data converted into the fixed data width are sequentially generated and outputted to the exterior.

Also in case of the data width conversion apparatus 20 shown in FIG. 3, in a similar fashion to that of the data width conversion apparatus 10 shown in FIG. 1, a shift is performed by an amount of shift corresponding to the data width of the output-incomplete partial data and the data width of the new input data so that the output data and the output-incomplete partial data are generated. Thus, as compared with the data width conversion apparatus dealing with fixed width of data, it is possible to greatly improve a data width conversion processing speed.

Figure 4:
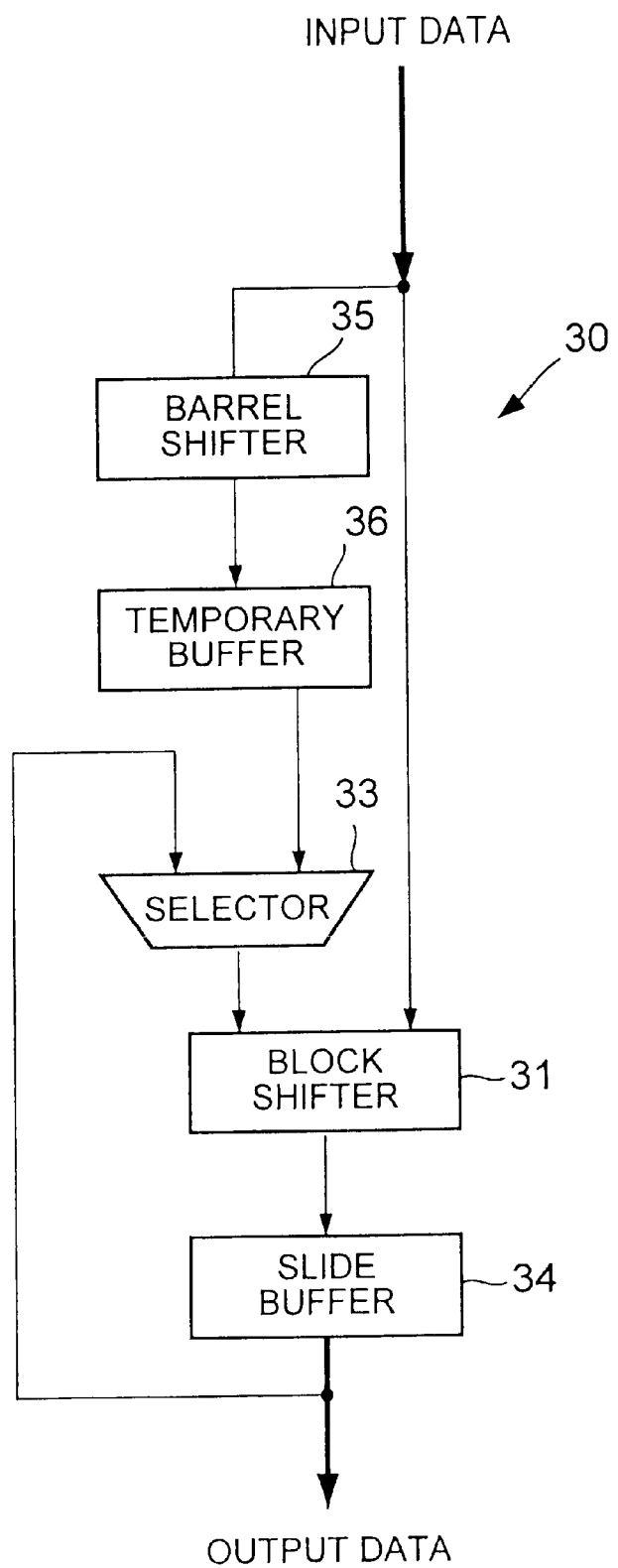
FIG. 4 is a block diagram showing a third embodiment of a data width conversion apparatus of the present invention.

FIG. 4 is a block diagram showing a third embodiment of a data width conversion apparatus of the present invention. Also here, in a similar fashion to that of FIG. 3, there are omitted structural portions corresponding to the buffer control unit 17 and the shift amount-computing unit 18 shown in FIG. 1.

A data width conversion apparatus 30 shown in FIG. 4 comprises a block shifter 31, a selector 33, a slide buffer 34, a barrel shifter 35 and a temporary buffer 36.

The selector 33 is changed over in such a manner that when the temporary buffer 36 stores therein effective data, the data stored in the temporary buffer 36 is transmitted to the block shifter 31, and when the temporary buffer 36 does not store therein effective data, the data stored in the slide buffer 34 is transmitted to the block shifter 31.

Data stored in the temporary buffer 36, wherein the temporary buffer 36 stores therein effective data, or data stored in the slide buffer 34, wherein the temporary buffer 36 does not store therein effective data and the slide buffer 34 stores therein data having data width less than that of the output data, is combined with the new input data in the block shifter 31 and then stored in the slide buffer 34. At that time, when the data newly stored in the slide buffer 34 is data having data width still less than that of the output data, the data stored in the slide buffer 34 is not dealt with as the output data and the output write enable signal WEO (cf. FIG. 1) is not outputted. On the other hand, when the data newly stored in the slide buffer 34 is data having data width of the output data, the data stored in the slide buffer 34 is dealt with as the output data, and data is stored in the slide buffer 34 and the output write enable signal WEQ is outputted.

When the block shifter 31 generates data of the data width that is the same as that of the output data, there is a case where a part of the new input data is not used as the output data and exceeds. In this case, the barrel shifter 35 shifts the input data by an amount of shift in which a partial data involved in exceeding is extracted, so that the partial data involved in exceeding is extracted. The extracted partial data is stored in the temporary buffer 36.

According to the data width conversion apparatus 30 shown in FIG. 4, the above-mentioned operation is repeated whenever the new input data is fed, and the output data of the fixed data width is outputted via the slide buffer 34 to the exterior.

Also in case of the data width conversion apparatus 30 shown in FIG. 4, in a similar fashion to that of the data width conversion apparatuses 10 and 20 shown in FIGS. 1 and 3, a shift is performed by an amount of shift corresponding to the data width of the output-incomplete partial data and the data width of the new input data so that the output data and the output-incomplete partial data are generated. Thus, as compared with the data width conversion apparatus dealing with fixed width of data, it is possible to greatly improve a data width conversion processing speed.

Figure 5:
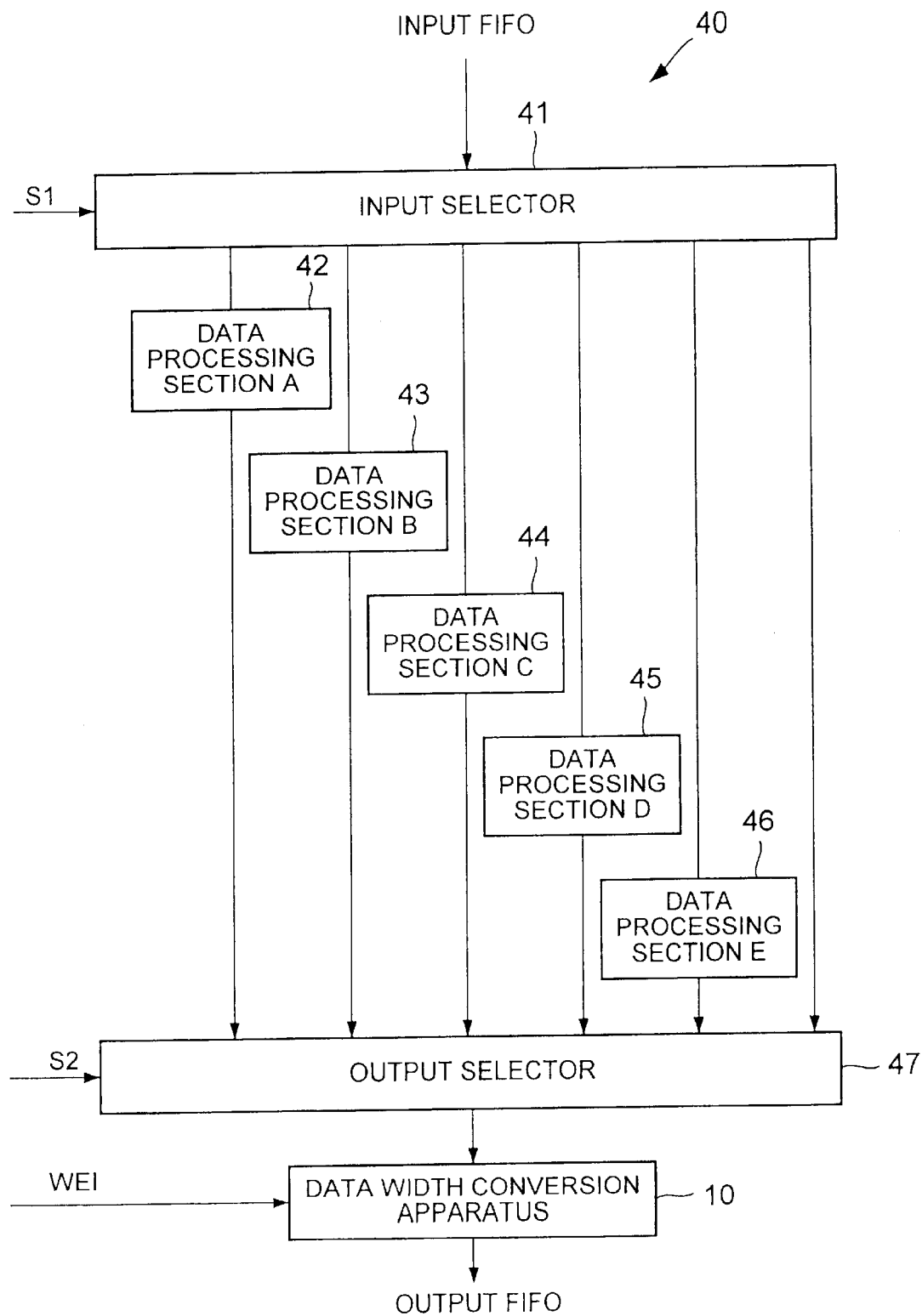
FIG. 5 is a block diagram showing an embodiment of a data processing apparatus of the present invention.

FIG. 5 is a block diagram showing an embodiment of a data processing apparatus of the present invention.

A data processing apparatus 40 comprises an input selector 41, a plurality of data processing sections 42–46, an output selector 47 and the data width conversion apparatus 10 shown in FIG. 1.

The input selector 41 transmits data fed via an input FIFO (First-in First-out) memory to a data processing section, which is selected in accordance with a selection signal S1 from among the plurality of data processing sections 42–46.

The plurality of data processing sections 42–46 performs mutually different data processing. Processed data created as a result of the data processing has mutually different bit width for each data processing section.

The output selector 47 selects one data processing section from among the plurality of data processing sections 42–46 in accordance with a selection signal S2, and transmits processed data generated in the selected data processing section to the data width conversion apparatus 10.

The data width conversion apparatus 10, which has a structure shown in FIG. 1, receives data transmitted from the output selector 47 in accordance with the input write enable signal WEI, and converts the received data to a predetermined fixed data width of output data in accordance with the above-mentioned operation and then outputs the same to an output FIFO memory of the exterior.

The input selector 41 sequentially receives data from the input FIFO memory and distributes the sequentially received data to the data processing sections in accordance with the selection signal S1. The output selector 47 sequentially transmits the data (the processed data) processed by the respective data processing sections to the data width conversion apparatus 10 in accordance with the selection signal S2. The data width conversion apparatus 10 sequentially receives the processed data sequentially transmitted in accordance with the input write enable signal WEI, and sequentially generates and transfers the output data to the output FIFO memory.

According to the data processing apparatus 40 shown in FIG. 5, input data are sequentially received, the respective processing is performed, so that a result of the respective processing can be effectively converted into a predetermined fixed data width of output data and be outputted.

While it has been explained in the above description that the data processing apparatus 40 shown in FIG. 5 is provided with the data width conversion apparatus 10 shown in FIG. 1, it is acceptable that the data processing apparatus 40 is provided with the data width conversion apparatus 20 shown in FIG. 3, or the data width conversion apparatus 30 shown in FIG. 4, instead of the data width conversion apparatus 10 shown in FIG. 1.

Figure 6:
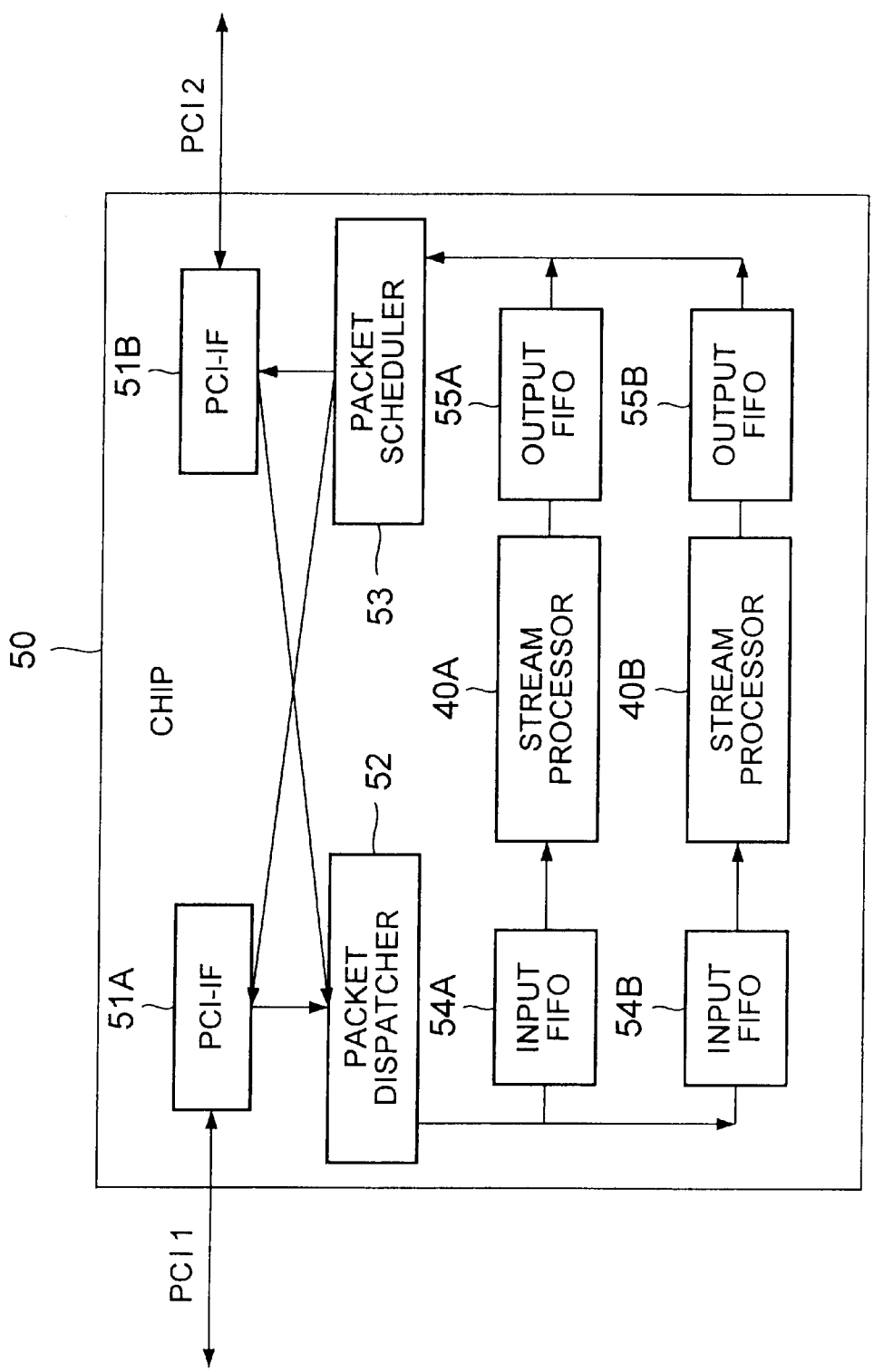
FIG. 6 is a block diagram showing a circuit structure of a semiconductor chip on which an embodiment of a data processing apparatus of the present invention is loaded.

FIG. 6 is a block diagram showing a circuit structure of a semiconductor chip on which an embodiment of a data processing apparatus of the present invention is loaded.

On a semiconductor chip 50, there are loaded two PCI interfaces 51A and 51B, a packet dispatcher 52, a packet scheduler 53, two input FIFO memories 54A and 54B, two stream processors 40A and 40B, and two output FIFO memories 55A and 55B. Each of the stream processors 40A and 40B has the same structure as that of the data processing apparatus 40 shown in FIG. 5. Each of the PCI interfaces 51A and 51B serves to perform a communication between the semiconductor chip 50 and the external circuit via a PCI bus. The PCI interfaces 51A and 51B are connected to PCI buses PCI1 and PCI2, respectively. The packet dispatcher 52 receives data packets via the PCI interfaces 51A and 51B and distributes the data packets to the two input FIFO memories 54A and 54B. The data packet, which is received by the PCI interface 51A via the PCI bus PCI1, is transmitted to the input FIFO memory 54A by the packet dispatcher 52. The data packet, which is received by the PCI interface 51B via the PCI bus PCI2, is transmitted to the input FIFO memory 54B by the packet dispatcher 52.

The data packets, which are fed to the input FIFO memories 54A and 54B, respectively, are fed to the stream processors 40A and 40B, respectively. The stream processors 40A and 40B perform, as explained referring to FIG. 5, various types of processing, and the processed data are stored in the output FIFO memories 55A and 55B, respectively. The two stream processors 40A and 40B perform processing for data packets flowing in mutually different directions, and are mutually different in processing content. Here, there will be omitted an explanation of examples of the various types of processing.

The data, which are stored in the output FIFO memories 55A and 55B, are transferred via the packet scheduler 53 to the PCI interfaces 51A and 51B, respectively. The packet scheduler 53 transfers the data packet received via the output FIFO memory 55A to the PCI interface 51B, and the data packet received via the output FIFO memory 55B to the PCI interface 51A.

The PCI interface 51B transmits the data packet received from the packet scheduler 53 to the PCI bus PCI2. The PCI interface 51A transmits the data packet received from the packet scheduler 53 to the PCI bus PCI1.

As mentioned above, the semiconductor chip 50 serves to couple the two PCI buses with one another while performing the data processing.

Figure 7:
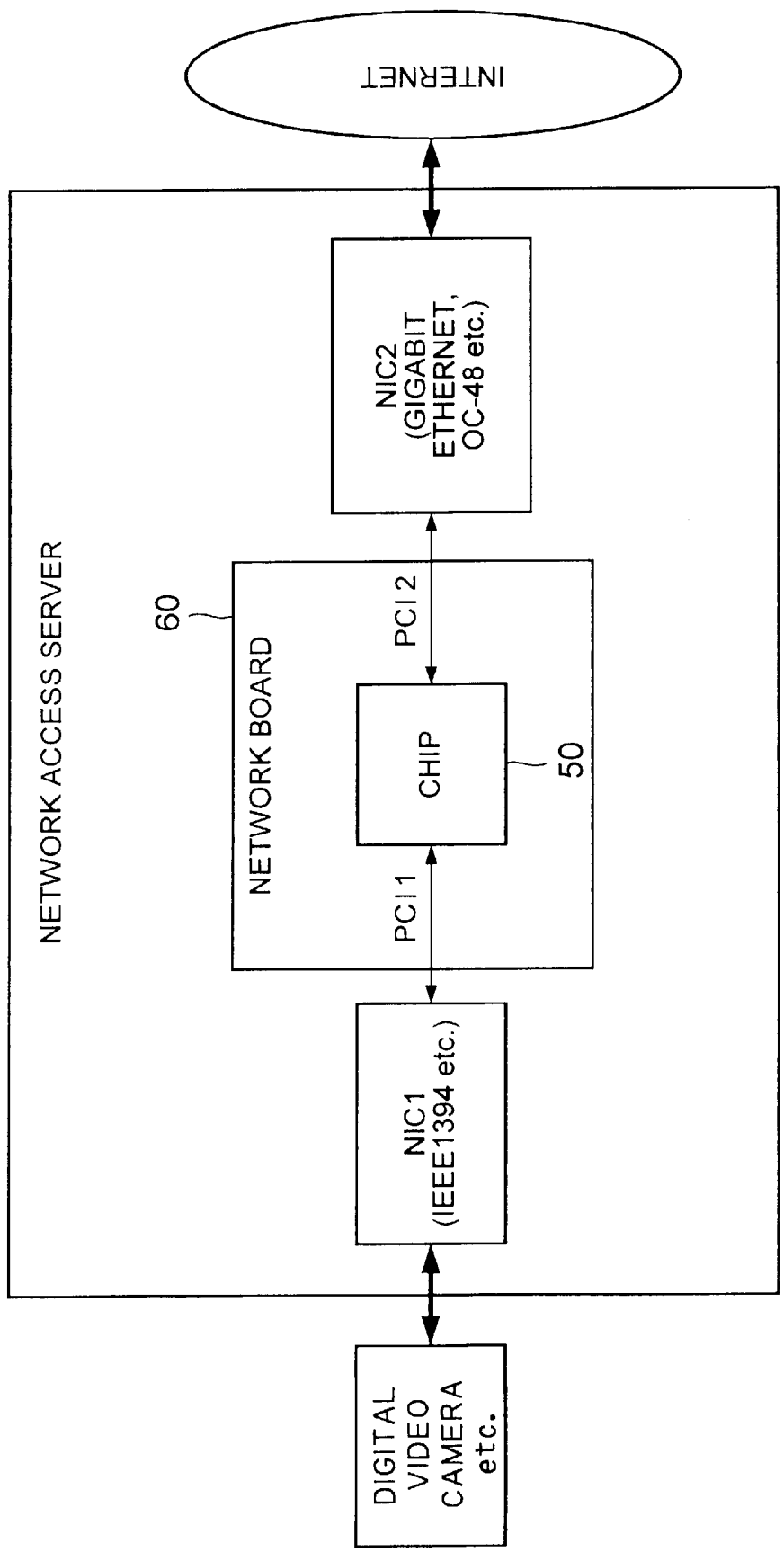
FIG. 7 is a conceptual view showing a network access server into which the semiconductor chip shown in FIG. 6 is incorporated.

FIG. 7 is a conceptual view showing a network access server into which the semiconductor chip shown in FIG. 6 is incorporated.

The network access server shown in FIG. 7 has two NICs (Network Interface Cards: NIC1 and NIC2). The two NICs NIC1 and NIC2 are coupled with each other via a network board 60 that is loaded with the chip 50 having the circuit structure shown in FIG. 6. The NIC1 is connected to digital equipment such as a digital video camera, and the NIC2 is connected to a global Internet.

Figure 8:
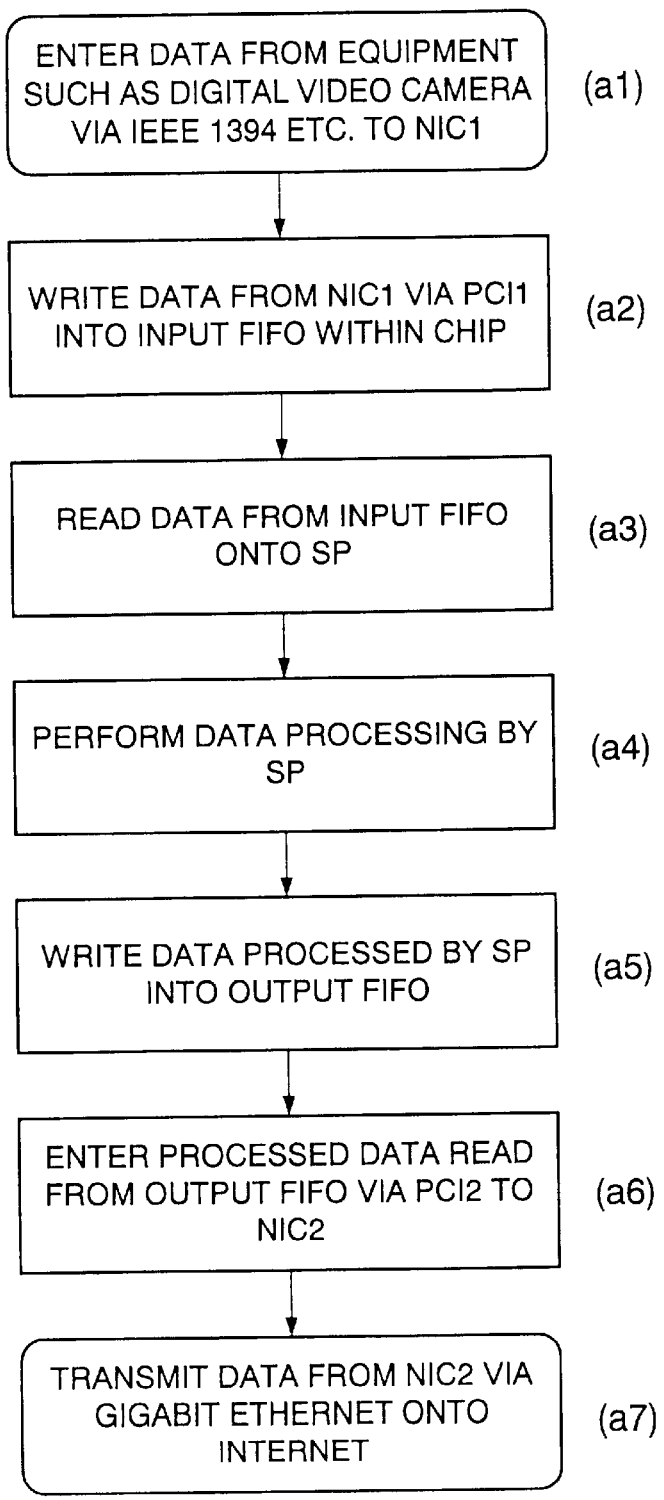
FIG. 8 is a flowchart useful for understanding a processing in a case where data is transmitted from digital equipment such as a digital video camera via the network access server shown in FIG. 7 to an Internet side.

FIG. 8 is a flowchart useful for understanding a processing in a case where data is transmitted from digital equipment such as a digital video camera via the network access server shown in FIG. 7 to an Internet side.

In the event that data is transmitted from digital equipment such as a digital video camera to the Internet side, data is fed from the digital equipment such as a digital video camera via a communication path based on a standard such as IEEE 1394 to the NIC1 (a step al), and the data is written from the NIC1 via the PCI1 into the input FIFO memory within the chip 50 (a step a2). Next, data is read from the input FIFO memory to the SP (packet scheduler (cf. FIG. 6 and FIG. 5))(a step a3), so that the SP performs the data processing (a step a4). The data processed in the SP is written into the output FIFO memory (a step a5). The processed data, which is read from the output FIFO memory, is fed via the PCI2 to the NIC2 (a step a6) and is transmitted from the NIC2 via a communication path based on Gigabit and Ethemet to the Internet (a step a7).

Figure 9:
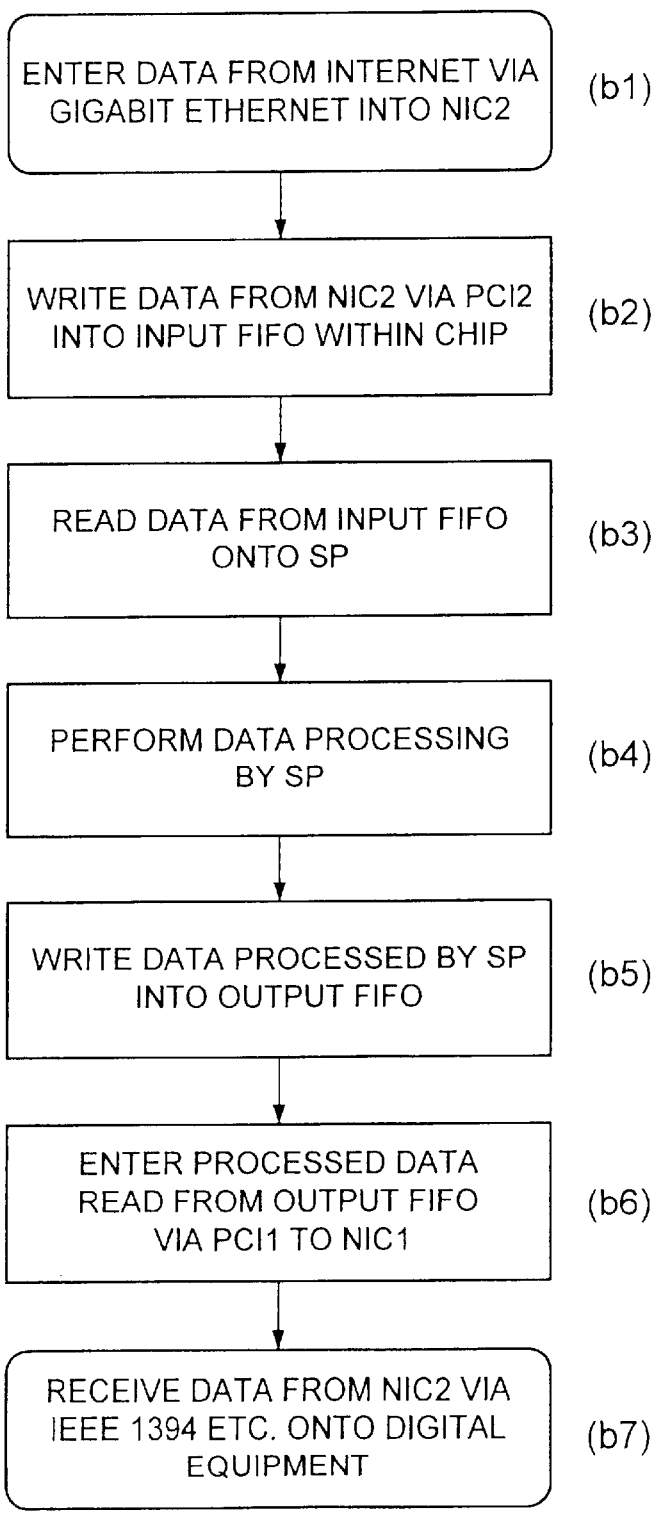
FIG. 9 is a flowchart useful for understanding a processing in a case where upon receipt of data from an Internet, the data is transmitted via the network access server shown in FIG. 7 to digital equipment such as a digital video camera.

FIG. 9 is a flowchart useful for understanding a processing in a case where upon receipt of data from an Internet, the data is transmitted via the network access server shown in FIG. 7 to digital equipment such as a digital video camera.

When data is transmitted from an Internet to digital equipment, data on the Internet is fed via a communication path based on a standard such as Gigabit and Ethenet to the NIC2 (a step b1). The data is written from the NIC2 via PCI2 to the input FIFO memory within the chip (a step b2). Next, the data is read from the input FIFO memory to the SP (A STEP B3), so that the SP performs the data processing (a step B4). The data processed in the SP is written into the output FIFO memory (a step B5). The processed data, which is read from the output FIFO memory, is fed via the PCI1 to the NIC1 (a step B6) and is transmitted from the NIC2 via a communication path based on a standard such as IEEE 1394 to the digital equipment (a step b7).

Figure 10:
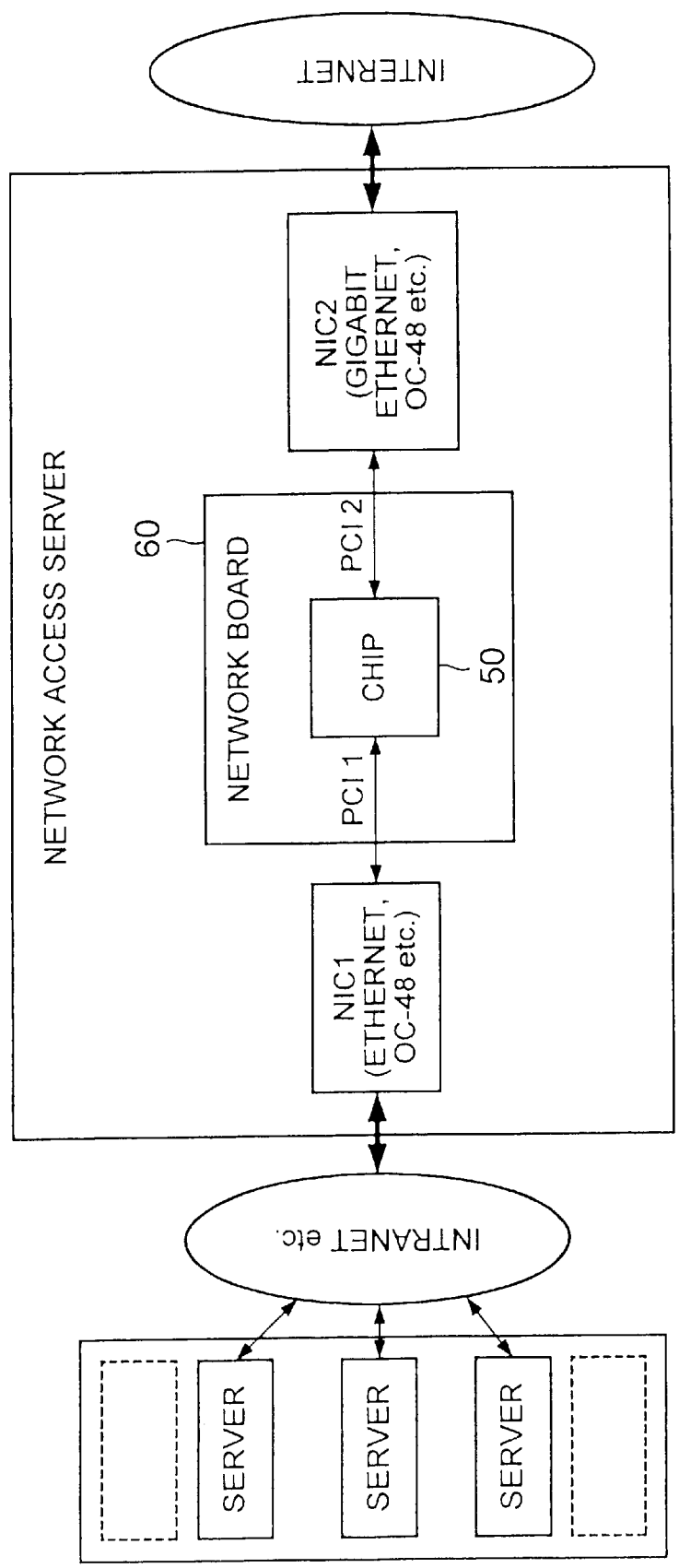
FIG. 10 is a conceptual view showing an alternative example of a network access server.

FIG. 10 is a conceptual view showing an alternative example of a network access server.

The network access server shown in FIG. 10 has, similar to FIG. 7, two NICs (NIC1 and NIC2) and the network board 60 that is loaded with the chip 50 having the circuit structure shown in FIG. 6. As mentioned above, each of the stream processors 40A and 40B, that constitute the semiconductor chip 50, corresponds to the data processing apparatus 40 as the embodiment of the present invention shown in FIG. 5, and the data processing apparatus 40 adopts a data width conversion apparatus as the embodiment of the present invention.

The NIC1, which constitutes the network server shown in FIG. 10, is connected to an Intranet of a certain company, and the NIC2 is, similar to FIG. 7, connected to a global Internet. The network server shown in FIG. 10 mediates between the Intranet or the like and the global Internet.

An operation of the network server shown in FIG. is similar to that of the network server shown in FIG. 7, and thus the explanation will be omitted.

Thus, the data width conversion apparatus and the data processing apparatus of the present invention are preferably adopted for mediation of a communication for data extending over two different communication paths.

As mentioned above, according to the present invention, it is possible to efficiently convert data having various data widths sequentially generated into data each having a fixed data width.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

a buffer for storing output-incomplete partial data of the input data received in the past; and a block shifter for combining the output-incomplete partial data stored in said buffer with new input data, wherein when data width of combined data of the output-incomplete partial data stored in said buffer with new input data is less than the fixed data width, the combined data is stored in said buffer in form of the output-incomplete partial data, when the data width of the combined data is identical to the fixed data width, the combined data is outputted to an exterior in form of the output data, and when the data width of the combined data exceeds the fixed data width, of the combined data partial data consisting of a portion of same data width as the fixed data width is outputted to an exterior in form of the output data, and of the combined data partial data consisting of a portion excepting the portion of the same data width as the fixed data width is stored in said buffer in form of the output-incomplete partial data.

2. A data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

first and second block shifters for receiving two types of data one of which is the input data to combine the two types of data and thereby outputting data having data width of a sum of data widths of the two types of data wherein the fixed data width is a maximum data width;

a selector for receiving total two types of data outputted from said first and second block shifters to output either one of the two types of data;

a slide buffer for storing therein the data outputted from said selector and outputting the stored data to an exterior in form of the output data when a data width of the stored data is identical to the fixed data width;

a barrel shifter for shifting the input data by an arbitrary number to extract and output a part of the input data; and a temporary buffer for storing the data outputted from said barrel shifter, wherein said first block shifter receives the input data and the data stored in said slide buffer, said second block shifter receives the input data and the data stored in said temporary buffer, said selector transmits the data outputted from said first block shifter to said slide buffer when said temporary buffer stores no effective data, and transmits the data outputted from said second block shifter to said slide buffer when said temporary buffer stores effective data, and said barrel shifter extracts from new input data a portion exceeding the fixed data width of a combined data wherein the new input data is combined with the data stored in said temporary buffer when said temporary buffer stores effective data, or the data stored in said slide buffer when said temporary buffer stores no effective data, when a data width of the combined data exceeds the fixed data width, the extracted portion being transferred to said temporary buffer.

3. A data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

first and second block shifters for receiving two types of data one of which is the input data to combine the two types of data and thereby outputting data having data width of a sum of data widths of the two types of data wherein the fixed data width is a maximum data width;

a slide buffer for storing therein the data outputted from said first block shifter and outputting the stored data to an exterior in form of the output data; and a temporary buffer for storing the data outputted from said second block shifter, wherein both of said first and second block shifters receive the input data and the data stored in said temporary buffer, said first block shifter generates and transmits to said slide buffer a combined data wherein a new input data is combined with the data stored in said temporary buffer when a data width of the combined data is identical to the fixed data width, and generates and transmits to said slide buffer, of the combined data, partial data consisting of a portion of same data width as the fixed data width when the data width of the combined data exceeds the fixed data width, and said second block shifter generates a combined data wherein a new input data is combined with the data stored in said temporary buffer when a data width of the combined data is less than the fixed data width, so that the combined data is stored in said temporary buffer, and generates and transmits to said temporary buffer partial data consisting of a portion excepting said partial data generated by said first block shifter when the data width of the combined data exceeds the fixed data width.

4. A data width conversion apparatus for sequentially receiving a plurality of input data permitted in a matter that their data widths are mutually different from one another, converting the plurality of input data sequentially received into a predetermined fixed data width of output data and sequentially outputting the output data, said data width conversion apparatus comprising:

a block shifter for receiving two types of data one of which is the input data to combine the two types of data and thereby outputting data having data width of a sum of data widths of the two types of data wherein the fixed data width is a maximum data width;

a slide buffer for storing therein the data outputted from said block shifter and outputting the stored data to an exterior in form of the output data when a data width of the stored data is identical to the fixed data width;

a barrel shifter for shifting the input data by an arbitrary number to extract and output a part of the input data;

a temporary buffer for storing the data outputted from said barrel shifter, and a selector for receiving the data stored in said temporary buffer and the data stored in said slide buffer to selectively output either one of two types of data, wherein said selector transmits the data stored in said slide buffer to said block shifter when said temporary buffer stores no effective data, and transmits the data stored in said temporary buffer to said block shifter when said temporary buffer stores effective data, and said barrel shifter extracts from new input data a portion exceeding the fixed data width of a combined data wherein the new input data is combined with the data stored in said temporary buffer when said temporary buffer stores effective data, or the data stored in said slide buffer when said temporary buffer stores no effective data, when a data width of the combined data exceeds the fixed data width, the extracted portion being transferred to said temporary buffer.

5. A data processing apparatus comprising:

a plurality of data processing sections for performing mutually different data processing to generate processed data, said plurality of data processing sections being permitted in a matter that generation of the processed data of mutually different data widths is permitted; and a data width conversion section for sequentially receiving a plurality of processed data generated in said plurality of data processing sections, converting the plurality of processed data sequentially received into a predetermined fixed data width of output data and sequentially outputting the output data, said data width conversion section comprising:
a buffer for storing output-incomplete partial data of the processed data received in the past; and
a block shifter for combining the output-incomplete partial data stored in said buffer with new processed data, wherein when data width of combined data of the output-incomplete partial data stored in said buffer with new processed data is less than the fixed data width, the combined data is stored in said buffer in form of the output-incomplete partial data, when the data width of the combined data is identical to the fixed data width, the combined data is outputted to an exterior in form of the output data, and when the data width of the combined data exceeds the fixed data width, of the combined data partial data consisting of a portion of same data width as the fixed data width is outputted to an exterior in form of the output data, and of the combined data partial data consisting of a portion excepting the portion of the same data width as the fixed data width is stored in said buffer in form of the output-incomplete partial data.

* * * * *